United States Patent
Alasti et al.

(10) Patent No.: US 12,349,049 B2
(45) Date of Patent: *Jul. 1, 2025

(54) ANCHOR POINT MOVEMENT IN A COMPOUND CELLULAR NETWORK

(71) Applicant: DISH Wireless L.L.C., Littleton, CO (US)

(72) Inventors: Mehdi Alasti, Reston, VA (US); Siddhartha Chenumolu, Ashburn, VA (US); Mariam Sorond, Reston, VA (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,187

(22) Filed: Nov. 13, 2023

(65) Prior Publication Data
US 2024/0080719 A1 Mar. 7, 2024

Related U.S. Application Data

(63) Continuation of application No. 17/867,864, filed on Jul. 19, 2022, now Pat. No. 11,856,464, which is a
(Continued)

(51) Int. Cl.
*H04W 36/00* (2009.01)
*H04W 36/12* (2009.01)
(Continued)

(52) U.S. Cl.
CPC ..... *H04W 48/17* (2013.01); *H04W 36/00222* (2023.05); *H04W 88/06* (2013.01); *H04W 88/16* (2013.01)

(58) Field of Classification Search
CPC ... H04W 16/14; H04W 60/00; H04W 60/005; H04W 68/02; H04W 76/16; H04W 88/06;
(Continued)

(56) References Cited

U.S. PATENT DOCUMENTS

2013/0021968 A1* 1/2013 Reznik .................. H04L 45/245 370/328
2013/0166746 A1* 6/2013 Andreasen .......... H04L 41/0893 709/225
(Continued)

FOREIGN PATENT DOCUMENTS

| CN | 103327531 A | 9/2013 |
| CN | 102498750 B | 10/2015 |

(Continued)

OTHER PUBLICATIONS

Ericsson et al: "Overall evaluation and conclusion of key issue 6 for NWDAF assisting traffic routing", 3GPP Draft; S2-1813201_WAS12797_WAS12370_NWDAF Assisted Traffic Routing, 3rd Generation Partnership Project (3GPP), Mobile Competence Centre; 650, Route Des Lucioles ; F-06921 Sophia-Antipolis Cedex vol. SA WG2, No. West Palm Beach, USA; Nov. 26, 2018 Nov. 30, 2018 1,5,10, 12,13, 18,20 X Nov. 30, 2018 (Nov. 30, 2018), XP051499690, Retrieved from the Internet; URL: http: //mm . 3gpp. org/ftp/tsg%5Fsa/WG2%5FArch/TSGS2%5F129BIS%5FWest%5FPalm%5FBeach /Docs/S2%2D1813201%2Ezip [retrieved on Nov. 30, 2018] p. 1-p. 5.

(Continued)

*Primary Examiner* — Nathan S Taylor
(74) *Attorney, Agent, or Firm* — Kilpatrick Townsend & Stockton LLP (57) ABSTRACT

A first cellular network may connect user equipment (UE) with a data network using a first anchor point. The first cellular network may transition the UE from the first anchor point to a second anchor point. Following the transitioning, the first cellular network may connect the UE with the data network using the second anchor point. The UE may then be transitioned from the second anchor point to a converged anchor point of the first cellular network. The UE may be
(Continued)

locked to the converged anchor point while the UE is communicating with a second cellular network.

17 Claims, 6 Drawing Sheets

Related U.S. Application Data continuation of application No. 17/009,578, filed on Sep. 1, 2020, now Pat. No. 11,425,610, which is a continuation of application No. 16/680,094, filed on Nov. 11, 2019, now Pat. No. 10,841,844.

(60) Provisional application No. 62/886,916, filed on Aug. 14, 2019.

(51) Int. Cl.
*H04W 48/00* (2009.01)
*H04W 88/06* (2009.01)
*H04W 88/16* (2009.01)

(58) Field of Classification Search
CPC . H04W 8/06; H04W 28/0273; H04W 28/085; H04W 36/0066; H04W 36/0069; H04W 80/02; H04W 28/02; H04W 28/08; H04W 36/125; H04W 36/0022; H04W 48/17; H04W 88/16; H04L 45/22; H04L 47/34; H04L 12/707; H04L 12/801
USPC ......................................................... 455/439
See application file for complete search history.

(56) References Cited

U.S. PATENT DOCUMENTS

| | | | | |
|---|---|---|---|---|
| 2016/0044690 | A1* | 2/2016 | Li ..................... | H04B 7/0617 370/329 |
| 2017/0085494 | A1* | 3/2017 | Park ..................... | H04L 47/70 |
| 2017/0374573 | A1* | 12/2017 | Kleinbeck .............. | H04B 17/23 |
| 2018/0020386 | A1* | 1/2018 | Chandramouli .. | H04W 36/0027 |
| 2018/0020418 | A1* | 1/2018 | Chandramouli ...... | H04W 76/16 |
| 2018/0070253 | A1* | 3/2018 | Kleinbeck ............ | H04B 17/309 |
| 2018/0092142 | A1 | 3/2018 | Han et al. | |
| 2018/0199328 | A1* | 7/2018 | Sang ..................... | H04W 36/06 |
| 2018/0227219 | A1* | 8/2018 | Zhang .............. | H04W 28/0273 |
| 2018/0279375 | A1* | 9/2018 | Jeon ..................... | H04W 72/23 |
| 2018/0288784 | A1* | 10/2018 | Stojanovski ...... | H04W 28/0252 |
| 2018/0302834 | A1* | 10/2018 | Zhang ................. | H04W 36/38 |
| 2019/0053117 | A1* | 2/2019 | Bae .................... | H04W 36/125 |
| 2019/0166506 | A1* | 5/2019 | Ashrafi ................ | H04B 1/0003 |
| 2020/0229059 | A1* | 7/2020 | Xu ..................... | H04W 36/0011 |
| 2020/0348409 | A1* | 11/2020 | McLaughlin ......... | G01S 13/765 |
| 2021/0099367 | A1* | 4/2021 | Han ...................... | H04L 43/026 |
| 2021/0119866 | A1* | 4/2021 | Premnath ............ | H04L 12/4641 |
| 2022/0124542 | A1* | 4/2022 | Li ........................ | H04W 88/085 |
| 2022/0345938 | A1* | 10/2022 | Gupta ................... | H04W 88/10 |
| 2023/0180038 | A1* | 6/2023 | Chen ..................... | H04W 24/08 370/252 |
| 2023/0184872 | A1* | 6/2023 | Kalogiros ........... | H04W 64/003 |

FOREIGN PATENT DOCUMENTS

| | | | |
|---|---|---|---|
| CN | 107770828 | A | 3/2018 |
| CN | 109392043 | A | 2/2019 |
| CN | 109392043 | B | 2/2019 |
| CN | 108632917 | B | 8/2019 |
| CN | 107950056 | B | 2/2021 |
| CN | 108811000 | B | 2/2021 |
| CN | 109996303 | B | 6/2021 |
| EP | 4 145 882 | A1 | 3/2023 |
| JP | 2017143350 | A | 8/2017 |
| WO | 2018/128494 | A1 | 7/2018 |
| WO | 2018/128529 | A1 | 12/2018 |
| WO | 2019/072902 | A1 | 4/2019 |
| WO | WO-2020252377 | A1 * | 12/2020 ........ H04W 28/0252 |
| WO | 2021/091439 | A1 | 5/2021 |
| WO | 2021/218718 | A1 | 11/2021 |

OTHER PUBLICATIONS

"3rd Generation Partnership Project; Technical Specification Group Services and System Aspects; Management and orchestration; Study on enhancement of Management Data Analytics (MDA) (Release 17)", 3GPP Standard; Technical Report; 3GPP TR 28.809, 3rd Generation Partnership Project (3GPP), Mobile Competence Centre; 650, Route Des Lucioles ; F-06921 Sophia-Antipolis Cedex ; Prance vol. SA WG5, No. V17.0.0 Apr. 6, 2021 (Apr. 6, 2021), pp. 1-96, XP052000543, Retrieved from the Internet: URL:https://ftp.3gpp.org/Specs/archive/28_ series/28.809/28809-h00.zip 28809-h00.docx [retrieved on Apr. 6, 2021] p. 12 p. 75-p. 76.

Telstra et al: "Support for Hybrid Access and ATSSS", 3GPP DRAFT;S2-1906288_WAS6278_WAS6236_WAS5007 _5WWC_HYBRIDAC CESS_ATSSS_5G-RG_ V1, vol. SA WG2, No. Reno, NV, USA; 20190513-20190517 May 17, 2019 (May 17, 2019), XP051743973, Retrieved from the Internet: URL:http://www.3gpp.org/ftp/tsg%5Fsa/WG2%5FArch/TSGS2%5F133%5FReno/Docs/S2%2D1906288%2Ezip [retrieved on May 17, 2019].

* cited by examiner

ANCHOR POINT MOVEMENT IN A COMPOUND CELLULAR NETWORK

CROSS REFERENCE TO RELATED APPLICATION

This Application is a continuation of U.S. patent application Ser. No. 17/867,864, filed Jul. 19, 2022, entitled "Anchor Point Movement in a Compound Cellular Network," which is a continuation of U.S. patent application Ser. No. 17/009,578, filed Sep. 1, 2020, entitled "Anchor Point Movement in a Compound Cellular Network," now U.S. Pat. No. 11,425,610, which is a continuation of U.S. patent application Ser. No. 16/680,094, filed on Nov. 11, 2019, now U.S. Pat. No. 10,841,844, which claims priority to U.S. Provisional Application No. 62/886,916, filed Aug. 14, 2019, entitled "Anchor Point Movement in a Compound Cellular Network," the entire disclosures of which are hereby incorporated by reference for all purposes.

BACKGROUND

When designing a cellular network, a cellular network operator may need to balance various factors, including balancing a desire to use the most efficient and newest cellular network architecture against having backwards compatibility with previous-generation cellular networks. Embodiments detailed herein allow a cellular network operator to realize the benefits of using both the most up-to-date cellular network architecture and obtaining compatibility with previous-generation equipment.

SUMMARY

Various embodiments are described related to a compound cellular network that accommodates multiple cellular communication protocols. In some embodiments, a compound cellular network that accommodates multiple cellular communication protocols is described. The system may comprise a standalone network portion of a first cellular network comprising a plurality of anchor points. The standalone network portion may operate according to only a first cellular communication protocol. The plurality of anchor points may be geographically distributed. Each anchor point of the plurality of anchor points may serve as a gateway for a user equipment with a data network. Which anchor point of the plurality of anchor points serves as the gateway for the user equipment may be varied based on latency or load. The system may comprise a converged core network portion of the first cellular network, comprising a converged anchor point distinct from the plurality of anchor points. The converged core network portion may operate according to the first cellular communication protocol and a second cellular communication protocol. When the user equipment connects with a separate, second cellular network that may use the second cellular communication protocol, the user equipment may be locked to the converged anchor point of the converged core network portion of the first cellular network as the gateway with the data network.

Embodiments of such a method may include one or more of the following features: the first cellular communication protocol may be 5G New Radio (NR). The second cellular communication protocol may be 4G Long Term Evolution (LTE). The second cellular network may be a non-standalone 5G cellular network that may comprise 4G evolved packet core (EPC) components. The data network may comprise the Internet. The converged core network portion may be located near a geographical edge of the compound cellular network such that beyond the geographical edge, the user equipment may roam on the second cellular network that uses the second cellular communication protocol. The converged core network portion may be physically located such that a coverage area of base stations of the converged core network portion overlaps a coverage area of the second cellular network that may use the second cellular communication protocol. The user equipment may not be locked to using the converged anchor point as the gateway with the data network while the user equipment may be communicating with base stations of the converged core network portion. The converged core network portion may remain used as the gateway with the data network for the user equipment regardless of where the user equipment roams on the second cellular network while remaining connected with the second cellular network.

In some embodiments, a method for using a compound cellular network that accommodates multiple cellular communication protocols is described. The method may comprise connecting, by the compound cellular network, a user equipment (UE) with a data network using a first anchor point while the UE may use a standalone network portion of the compound cellular network. The anchor points may serve as communication gateways between the data network and the UE. The standalone network portion may operate according to only a first cellular communication protocol. The method may comprise transitioning, by the compound cellular network, the UE from using the first anchor point to using a second anchor point of the compound cellular network. The method may comprise, following the transitioning, connecting, by the compound cellular network, the UE with the data network using the second anchor point while the UE may use the standalone network portion of the compound cellular network. The method may comprise following connecting the UE with the data network using the second anchor point, transitioning, by the compound cellular network, the UE from the second anchor point to a converged anchor point of the compound cellular network. The converged anchor point may be part of a converged core network portion of the compound cellular network that operates according to the first cellular communication protocol and a second cellular communication protocol. The method may comprise, following transitioning the UE from the second anchor point to the converged anchor point, locking the UE to the converged anchor point while the UE may be communicating with a second cellular network that may communicate using the second cellular communication protocol.

Embodiments of such a method may include one or more of the following features: communicating, by the UE, with the second cellular network using the second cellular communication protocol. The method may further comprise, while the UE may be communicating with the second cellular network using the second cellular communication protocol, using the converged anchor point of the compound cellular network for access to the data network regardless of where the UE roams within the second cellular network. The first cellular communication protocol may be 5G New Radio (NR). The second cellular communication protocol may be 4G Long Term Evolution (LTE). The second cellular network may be a non-standalone 5G network that may comprise 4G evolved packet core (EPC) components. The data network may comprise the Internet. The converged core network portion may be located near a physical edge of the compound cellular network such that beyond the physical edge of the system, the user equipment roams on the second cellular network that uses the second cellular communication protocol. The converged core network portion of the compound cellular network has a geographic coverage area that may overlap the second cellular network that uses the second cellular communication protocol. The user equipment may not be locked to using the converged anchor point as the communication gateway with the data network while the user equipment may be wirelessly connected with the converged core network portion of the compound cellular network. The method may further comprise, following locking the UE to the converged anchor point while the UE may be communicating with the second cellular network, connecting, by the compound cellular network, the UE with the data network using a third anchor point when the UE may be again communicating wirelessly with the compound cellular network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

A wireless cellular network, such as a 5G New Radio (NR) cellular network, can be constructed using various architectures. A first architecture may only use one radio access technology (RAT) or a single wireless cellular communication protocol, such as 5G NR for the radio access network (RAN) and a 5G core as the cellular network's core componentry. Such a dedicated 5G NR wireless cellular network can be referred to as a "standalone 5G network" and can have certain advantages, such as having a simpler architecture and less expensive to deploy than other forms of cellular networks that include compatibility for other cellular communication protocols. However, a drawback to a standalone 5G network may be the lack of compatibility for other cellular protocols. For instance, user equipment (UE) roaming on a non-5G cellular network (e.g., a 4G LTE network) or non-standalone 5G cellular network (e.g., a network that uses 5G for communication with UE but where the core network uses 4G Evolved Packet Core (EPC)) may not be possible if the UE's home cellular network's architecture is a standalone 5G network that has a 5G core and, therefore, does not support additional wireless communication protocols to enable communication with an EPC.

A second possible architecture for a wireless cellular network can involve the cellular network being accessible via multiple RATs or multiple wireless cellular communication protocols. For instance, a cellular network could be compatible with 4G LTE and 5G NR. While such a network may have both 4G and 5G network components, the network core may use 4G components, which can be referred to as a 4G core or EPC. Such an arrangement may have the advantage of being able to accommodate multiple RATs, may help transition from 4G to 5G, and faster deployment of 5G, but may have the drawback of using a less efficient (and possibly more expensive) core network architecture. The core network may be built around an older RAT, such as 4G's EPC architecture with compatibility incorporated for 5G.

An anchor point refers to the cellular network core component that serves as a gateway between an external data network, such as the Internet, and the user equipment. For some types of cellular networks, such as the previously-detailed second architecture that can use 4G EPC, the anchor point is fixed. That is, regardless of where the UE physically moves while connected with the cellular network, even if hundreds or thousands of miles away, the network's core component that functions as the anchor point between the UE and the data network remains the same. Such an arrangement can result in increased latency, lower bandwidth, or both due to the increased path length between the UE and the data network. However, for some other types of cellular networks, such as the previously-discussed first architecture that uses a 5G NR core, the anchor point can be adjusted to decrease latency. Depending on the mode of the cellular network, the anchor point can be reassigned as the UE moves. Therefore, an anchor point that is most efficient (e.g., lowest latency, greatest bandwidth, shortest physical distance) may be used based on where the UE is located.

Embodiments detailed herein capture at least some of the advantages of the first architecture and the second architecture. For instance, embodiments detailed herein focus on a compound cellular network that uses 5G core components (and allow for the anchor point to be varied). However, near physical edges of the network footprint, where a UE is more likely to travel into a region where roaming occurs on a separate cellular network (e.g., another carrier's 4G LTE network), converged core components may be used that are compatible with multiple RATs (e.g., 5G and 4G).

Figure 1A:
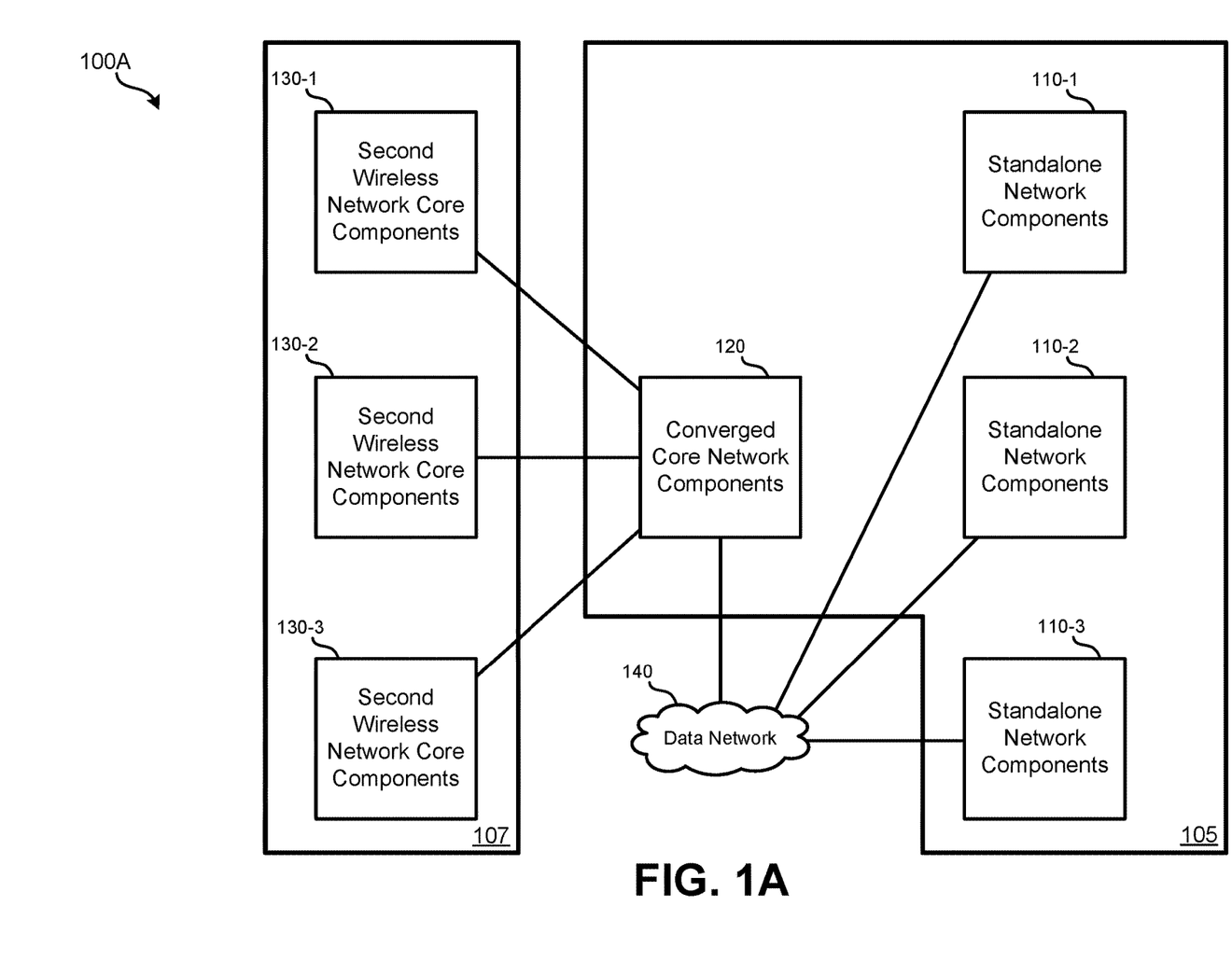
FIG. 1A illustrates an embodiment of a block diagram of a communication environment that includes a compound cellular network.

Further detail is provided in reference to the figures. FIG. 1A illustrates an embodiment of a block diagram of a communication environment 100A that includes a compound cellular network. Communication environment 100A can include compound cellular network 105 and cellular network 107. Compound cellular network 105 may be the primary (e.g., home) cellular network for various pieces of UE. However, occasionally, the UE may use cellular network 107 for cellular service, such as in geographical areas where a connection with a base station (BS) of compound cellular network 105 cannot be obtained. Physically, it is possible that compound cellular network 105 may cover a wholly different geographical region than cellular network 107. However, in many embodiments, there is significant overlap in the geographical regions serviced by compound cellular network 105 and cellular network 107.

Compound cellular network 105 may include multiple generations of cellular network core components. Compound cellular network 105 may include multiple standalone network components 110 (e.g., 110-1, 110-2, 110-3). Each of these standalone network components 110 may employ a single RAT, such as 5G NR. When UE physically moves within regions covered by compound cellular network 105, the UE may switch among using various standalone network components 110 as an anchor point to access data network 140, which may be the Internet. An anchor point defines the componentry of the cellular network that serves as a gateway between the cellular network and an external data network, such as the Internet. For instance, when a UE is in the vicinity of standalone network components 110-1, core components of standalone network components 110-1 may be used to access data network 140. At another time, the UE may be located in the vicinity of standalone network components 110-3, core components of standalone network components 110-3 may then be used to access data network 140.

Converged core network components 120 of compound cellular network 105 can function similarly to standalone network components 110 while a UE is in communication with compound cellular network 105. That is, if a UE moves to a geographic region near converged core network components 120, converged core network components 120 may be used as an anchor point to access data network 140. If the UE then moves away and is closer to, for example, standalone network components 110-2, standalone network components 110-2 may begin being used as the anchor point to access data network 140.

Converged core network components 120 has additional capabilities beyond standalone network components 110. While standalone network components 110 can communicate using only a single cellular RAT, such as 5G, converged core network components 120 include core components that function using multiple cellular standards, such as 5G NR and 4G LTE EPC. When UE is communicating with cellular network 107, which can be a 4G LTE cellular network, non-standalone 5G cellular network, or a cellular network based on some other RAT, regardless of which of second cellular network core components 130 that the UE is communicating with, converged core network components 120 remains used as the anchor point to access data network 140. Therefore, regardless of where the UE roams within cellular network 107, the anchor point is fixed to be converged core network components 120.

In order to decrease latency, converged core network components 120 may be located near where UE is expected to use cellular network 107. For instance, converged core network components 120 can be located near where a coverage area of compound cellular network 105 ends, but where coverage of cellular network 107 begins or continues.

Figure 1B:
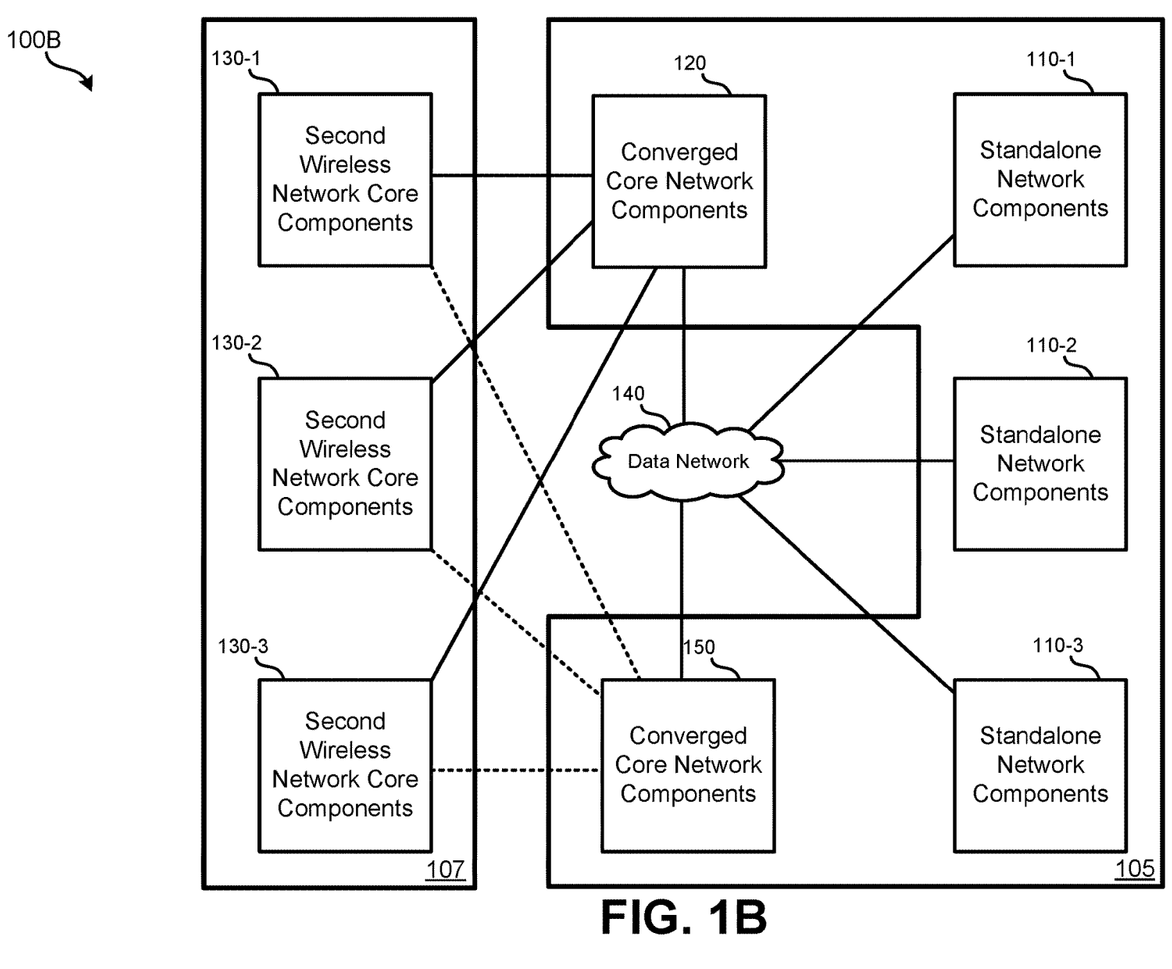
FIG. 1B illustrates another embodiment of a block diagram of a communication environment that includes a compound cellular network.

FIG. 1B illustrates another embodiment of a block diagram of a communication environment 100B that includes a compound cellular network. In communication environment 100B, multiple converged core network components (120, 150) are illustrated as part of compound cellular network 105. As detailed in relation to FIG. 1A, compound cellular network 105 may include multiple standalone network components 110 (e.g., 110-1, 110-2, 110-3). Each of these standalone network components 110 may employ a single RAT, such as 5G NR. When UE physically moves within regions covered by compound cellular network 105, the UE may switch among using various standalone network components 110 as an anchor point to access data network 140, which may be the Internet.

Converged core network components 120 and 150 of compound cellular network 105 can function similarly to standalone network components 110 while a UE is in communication with compound cellular network 105. That is, if a UE moves to a geographic region near converged core network components 120 or converged core network components 150, converged core network components 120 or 150 may be used as an anchor point to access data network 140.

Converged core network components 120 and 150 include core components that function using multiple cellular standards, such as 5G NR and 4G LTE EPC. When a UE transitions to communicating using cellular network 107 instead of compound cellular network 105, the components of compound cellular network 105 used as the anchor point to access data network 140 becomes fixed. For instance, if the UE was previously communicating with converged core network components 120 and then roams onto cellular network 107, converged core network components 120 may be used as the fixed anchor point for as long as the UE is roaming on cellular network 107 (regardless of where the UE roams within cellular network 107). If the UE was previously communicating with converged core network components 150 and then roams onto cellular network 107, converged core network components 150 may be used as the fixed anchor point for as long as the UE is roaming on cellular network 107 (regardless of where the UE roams within cellular network 107).

The UE may be assigned a particular converged core network components of compound cellular network 105 when the UE begins roaming on cellular network 107 to be used as the anchor point for the duration of the time that the UE is roaming on cellular network 107. For instance, if a UE was previously connected with standalone network components 110-2 then is next connected with second cellular network core components 130-2 of cellular network 107, either converged core network components 120 or converged core network components 150 may be selected by compound cellular network 105 to serve as the anchor point for the UE for the duration of the time that the UE is roaming within cellular network, regardless of where the UE roams within cellular network 107. The selection may be based on latency, geographic location, or one or more other factors.

As an example of how an anchor point is locked, if a UE connects with cellular network 107 using second cellular network core components 130-1, converged core network components 120 of compound cellular network 105 may be locked as the anchor point for accessing data network 140. If the UE moves and later communicates with second cellular network core components 130-3, even if converged core network components 150 would have lower latency or is geographically closer, converged core network components 120 remains used as the anchor point for the duration of the time that the UE is connected with cellular network 107.

If the UE disconnects from cellular network 107 and communicates directly with either converged core network components 120, converged core network components 150, or one or standalone network components 110, the anchor point may resume being shifted among these components. If the UE then reconnects with cellular network 107, an anchor point may be selected (and thus may be a different converged core network components of compound cellular network 105) and again may be locked.

In the examples of FIGS. 1A and 1B, the number of standalone network components 110, converged core network components 120 and 150, and second cellular network core components 130 is merely exemplary. In real-word implementations, the number of cellular networks from which a UE can roam onto from compound cellular network 105 may be greater than one and many more components and components may be present.

Figure 2:
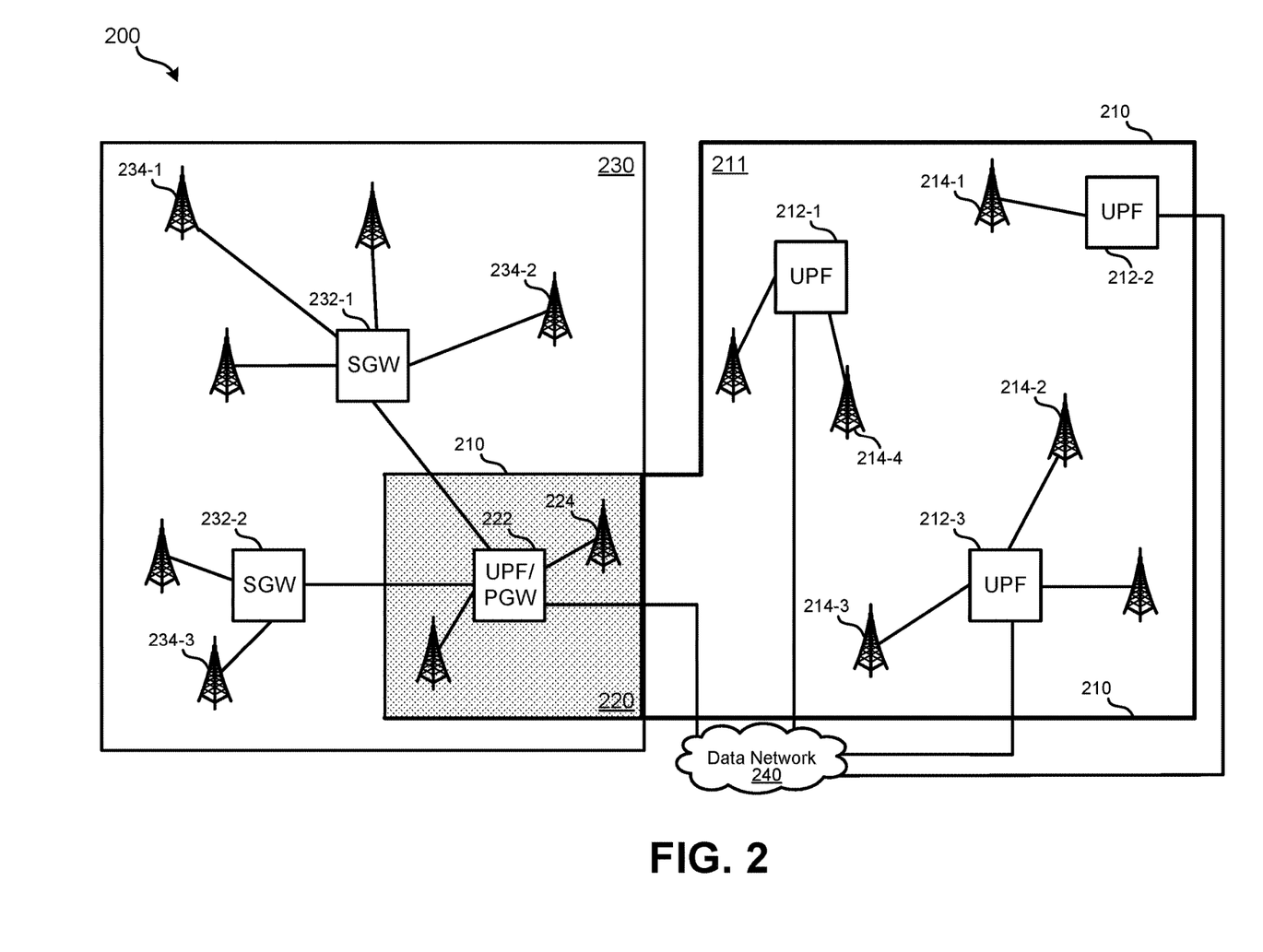
FIG. 2 illustrates an embodiment of a communication environment that includes a compound cellular network.

FIG. 2 illustrates an embodiment of a communication environment 200. Communication environment 200 can represent a more detailed embodiment of FIG. 1A. Communication environment 200 can be used in the context of bridging functionality between a 5G NR and a 4G LTE network on to which UE may roam. Communication environment 200 can include: compound cellular network 210 and cellular network 230. Compound cellular network 210 can include multiple portions, including: standalone network portion 211; and converged core network portion 220. Standalone network portion 211 represents a portion of compound cellular network 210 that includes a RAN and core components that function according to a single RAT, such as 5G. Standalone network portion 211 may only communicate using one RAT, such as 5G NR. Within standalone network portion 211 may be multiple anchor points. For a cellular network using 5G core components, the anchor point can be referred to as a UPF (user plane function). UPF 212 serve as the gateway between UE and data network 240, which may be the Internet. Multiple UPFs 212 (112-1, 212-2, 212-3) are present. Each UPF may serve one or more base stations of base stations 214. Base stations 214 can be gNodeBs (gNBs) in a 5G NR network. The UPF of UPFs 212 that serves a given base station of base stations 214 may be fixed.

As depicted, each UPF of UPF 212 are illustrated as in communication with particular base stations of base stations 214. Depending on the Session and Service Continuity (SSC) mode used for standalone network portion 211, which particular UPF a base station is communicating with on behalf of a UE may vary. For instance, in a first mode (e.g., SSC3), despite a UE moving among base stations, the UE may continue using a UPF as its anchor point until a new connection with a more efficient (e.g., lower latency, higher bandwidth, shorter geographic distance) UPF is made, which can be referred to colloquially as "make-before-break." In another mode (e.g., SSC2), a connection with the previously-used UPF may be ended before a new connection with a more efficient UPF is made, which can be referred to colloquially as "break-before-make." Therefore, while connections indicate the UPF which may be most efficient for a given base station, base stations may route data for UEs with other UPFs if needed.

If the compound cellular network is set to a permissible mode (e.g., SSC2 or SSC3 for 5G NR), as a UE moves within standalone network portion 211 and connects with different base stations of base stations 214, the UPF used to connect the UE with data network 240 can change. For instance, if a UE was connected with base station 214-4, UPF 212-1 may be used as the anchor point for the UE to communicate with data network 240. If the UE moves and begins communicating with base station 214-2, UPF 212-3 can be used as the anchor point for the UE to communicate with data network 240.

Converged core network portion 220 represents a portion of compound cellular network 210 that includes core components that are compatible with multiple RATs (multiple cellular communication protocols, such as 5G NR and 4G LTE. Rather than having the same type of anchor points as standalone network portion 211, converged core network portion 220 can have one or more anchor points that are compatible with multiple RATs. While a UE is operating as part of converged core network portion 220, such as by having a wireless connection with base station 224, functionality may be similar to as if the UE was within standalone network portion 211. That is, the anchor point may be adjusted to be UPF/PGW 222. While the UE is directly connected with a base station of converged core network portion 220, UPF/PGW 222 may function similarly to UPFs 212. For instance, if the UE moves back into standalone network portion 211, a transition may occur such that a different UPF is used as the UE's anchor point.

UPF/PGW 222 (User Plane Function/Packet Gateway) can represent a single component or multiple components functioning in concert. While a UPF may be used as a gateway between data network 240 and UE for 5G communication; a PGW may perform a similar function for 4G communication.

A UE may exit the region of compound cellular network 210 that has converged core regional data centers and may roam on cellular network 230. Cellular network 230 can be operated by a different network provider than compound cellular network 210. For instance, the provider of compound cellular network 210 may have an operating agreement with the provider of cellular network 230. Cellular network 230 operates using a different RAT than standalone network portion 211. For instance, cellular network 230 be a 4G LTE network or a 5G non-standalone network (that uses 4G EPC as its core). 4G LTE and 5G non-standalone (utilizing 4G EPC) differs from a standalone 5G NR network in that anchor points in a 4G EPC core network are fixed. While a UE is communicating with a base station of base stations 234 of cellular network 230, UPF/PGW 222 may remain the anchor point used for the UE regardless of where the UE roams within cellular network 230.

Within cellular network 230, each of base stations 234 may communicate with a serving gateway (SGW) 232. A SGW may forward data communications to the PGW servicing the UE, which would be UPF/PGW 222 of converged core network portion 220. If the UE moves within cellular network 230, the SGW of SGWs 232 used for forwarding data to UPF/PGW 222 may vary, but the anchor point for communicating with data network 240 remains UPF/PGW 222. UPF/PGW 222 may remain the anchor point at least until the UE disconnects from cellular network 230 and reconnects with compound cellular network 210. If the UE reconnects with a base station (e.g., base station 224) that is part of converged core network portion 220, UPF/PGW 222 may remain, at least initially, the anchor point for communication with data network 240. However, if the UE reconnects with another base station, such as base station 214-4, a UPF of UPFs 212 may be used as the anchor point instead.

Converged core network portion 220 may overlap with cellular network 230. That is, converged core network portion 220 may represent a region where UE can communicate with both compound cellular network 210 and cellular network 230. However, since compound cellular network 210 is the UE's home network, the UE would not connect with cellular network 230 unless compound cellular network 210 is unavailable. Regardless of whether converged core network portion 220 overlaps the coverage area of cellular network 230 or not, converged core network portion 220 may be located near a geographic edge of compound cellular network 210. Since the PGW functionality of converged core network portion 220 is only needed when a UE is communicating with a roaming cellular network that requires 4G compatibility or non-standalone 5G compatibility, there can be no need for implementing PGW functionality in standalone network portion 211. One possible goal when choosing a location for converged core network portion 220 may be to locate it such that UPF/PGW 222 will have relatively low latency for a large region in which UE may be expected to roam on cellular network 230.

Figure 3:
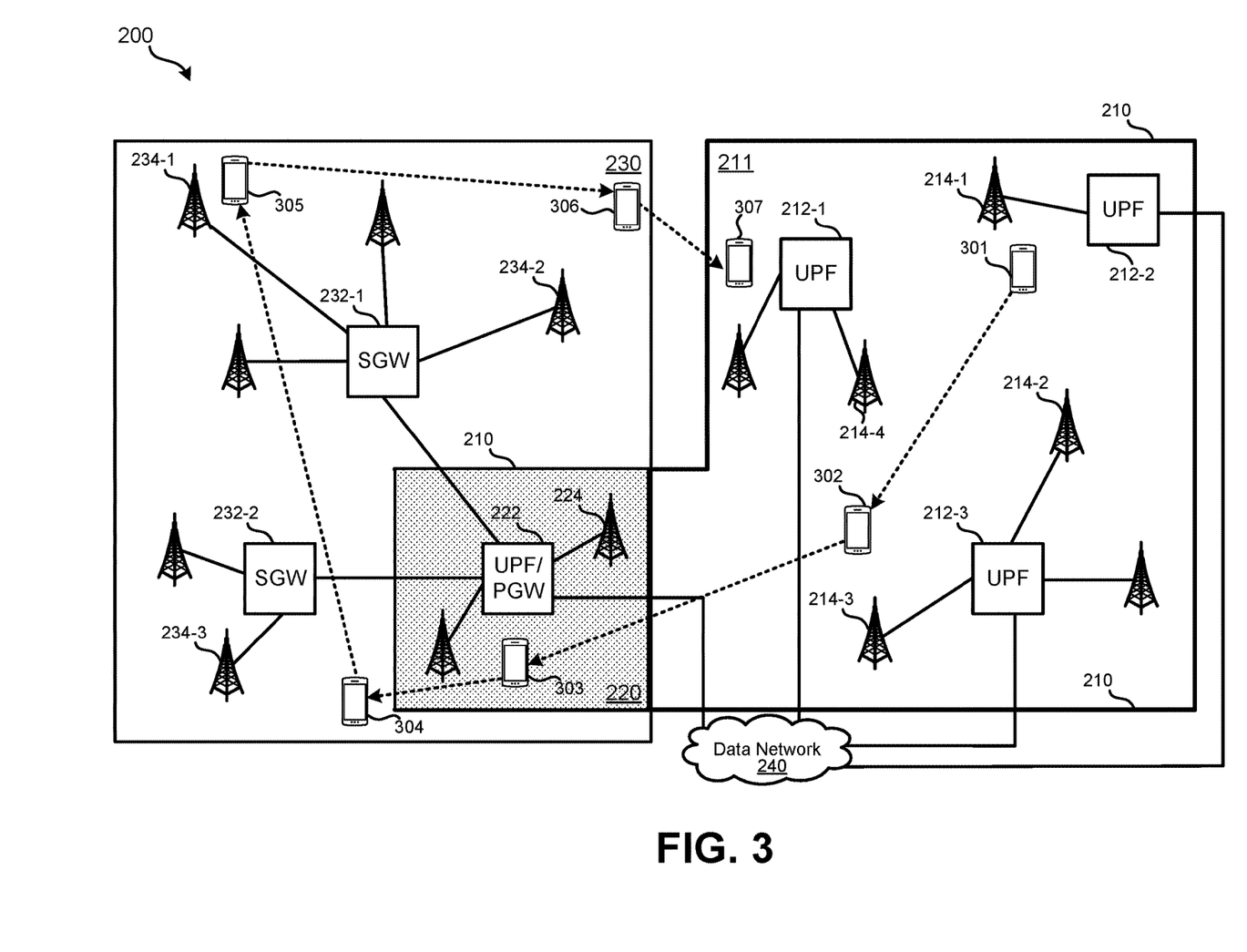
FIG. 3 illustrates an embodiment of user equipment (UE) moving within the compound cellular network and roaming off of the compound cellular network.

FIG. 3 illustrates an embodiment 300 of a UE moving within and roaming off of the compound cellular network. Embodiment 300 represents a UE moving within compound cellular network and roaming on cellular network 230. A UE may be any type of communication equipment that is capable of exchanging data with a wireless cellular network. Examples of UE can involve smartphones, cellular phones, tablet computer, wireless modems, laptop computers, and wireless access points (APs).

In embodiment 300, a single UE is depicted moving from UE location 301 to UE location 307. At UE location 301, the UE may communicate with base station 214-1 of standalone network portion 211. Assuming standalone network portion 211 is 5G and uses a 5G core network, the UE may connect to data network 240 using UPF 212-2 as the anchor point. The UE may move the UE location 302. At UE location 302, the UE may communicate with base station 214-3. The UE may be transitioned from using UPF 212-2 to using UPF 212-3 as the anchor point to connect with data network 240. The UE may move to UE location 303. At UE location 303, the UE may communicate with base station 224. While base station 224 is part of converged core network portion 220, since the UE is still directly connected with compound cellular network 210, the anchor point can continue to be moved. UPF/PGW 222 may be used as the anchor point for the UE communicating with data network 240.

At UE location 304, the UE has begun roaming on cellular network 230. Assuming cellular network 230 uses 4G as its RAT, UPF/PGW 222 is now locked as the anchor point for the UE to communicate with data network 240. Therefore, regardless of where the UE travels within cellular network 230, UPF/PGW 222 with remain the UE's anchor point. At UE location 304, the UE may communicate with base station 234-3, which may be an eNodeB (eNB). The UE may communicate with UPF/PGW 222 via SGW 232-2. The UE may move to UE location 305. At UE location 305, the UE may communicate with base station 234-1. To communicate with data network 240, data may be routed through SGW 232-1 and UPF/PGW 222. At UE location 306, the UE may be communicating with base station 234-2. Again here, to communicate with data network 240, data may be routed through SGW 232-1 and UPF/PGW 222. However, when the UE moves to UE location 307, since the UE is now back on compound cellular network 210, the anchor point of the UE may be transitioned to UPF 212-1.

Figure 4:
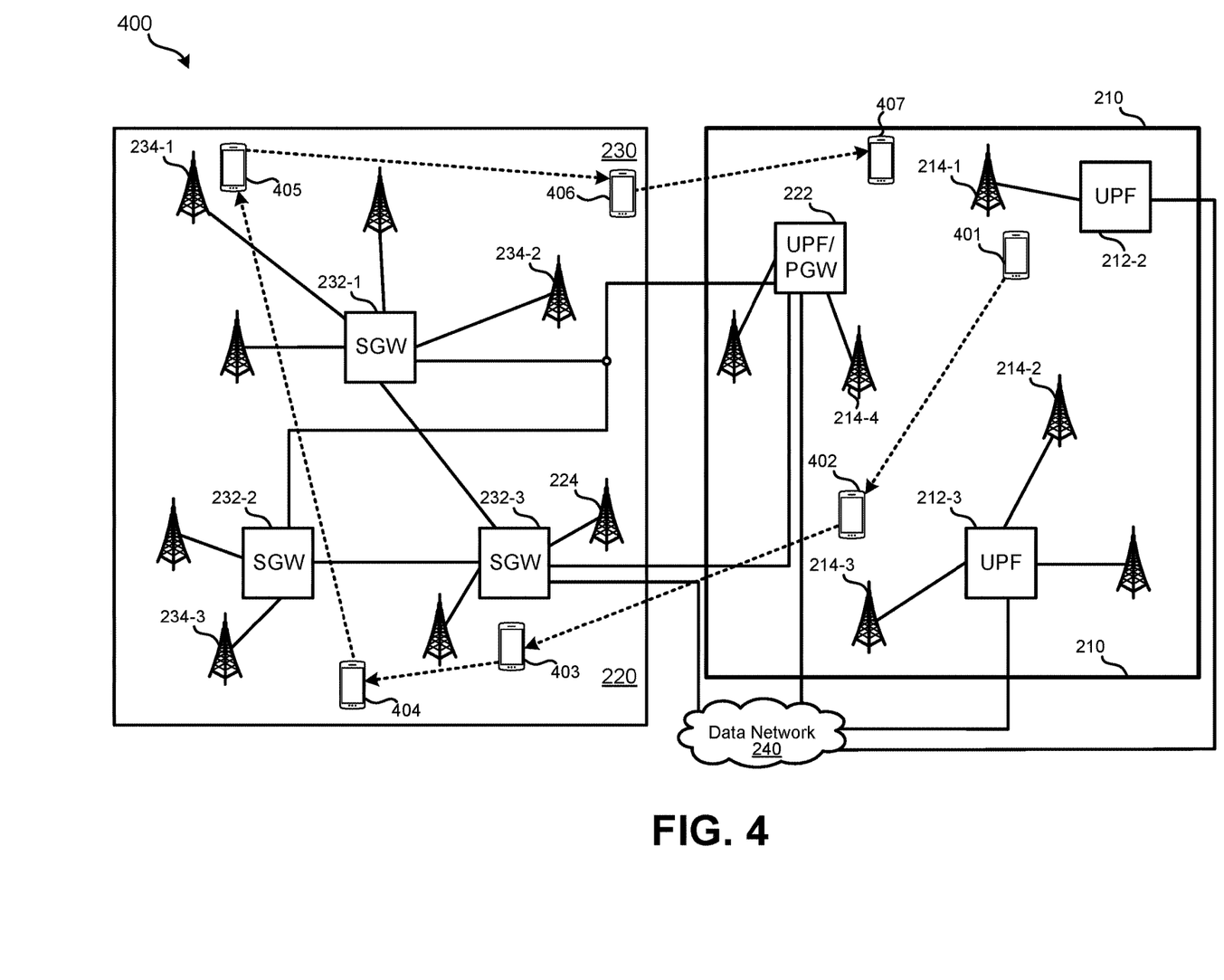
FIG. 4 illustrates another embodiment of UE moving within the compound cellular network and roaming off of the compound cellular network.

FIG. 4 illustrates an embodiment 400 of a UE moving within and roaming off of compound cellular network 210. Embodiment 400 represents a UE moving within compound cellular network and roaming on cellular network 230. In this embodiment, UPF/PGW 222 is not located in a geographic region that physical overlaps a coverage area of cellular network 230.

In embodiment 400, a single UE is depicted moving from UE location 401 to UE location 407. At UE location 401, the UE may communicate with base station 214-1, which is part of a standalone network portion. UPF 212-2 is part of a standalone 5G network portion and uses a 5G core network, therefore the UE may connect to data network 240 using UPF 212-2 as the anchor point. The UE may move the UE location 402. At UE location 402, the UE may communicate with base station 214-3. The UE may be transitioned from using UPF 212-2 to using UPF 212-3 as the anchor point to connect with data network 240. The UE may then move to UE location 403. At UE location 403, the UE may communicate with base station 224, which is connected with SGW 232-3. A PGW that is part of compound cellular network 210 may be used as a fixed anchor point for the remainder of time that the UE is roaming on cellular network 230. SGW 232-3 may communicate with UPF/PGW 222 of compound cellular network 210. In some embodiments, a private network connection is used between SGW 232-3 and UPF/PGW 222; in other embodiments, data network 240 may be used for communication between SGW 232-2 and UPF/PGW 222.

At UE location 404, the UE may communicate with BS 234-3, which communicates with SGW 232-2. SGW 232-2 may communicate with UPF/PGW 222, which remains the anchor point, either via a private network connection or via data network 240. At UE location 405, the UE may communication with BS 234-1, which may communicate with SGW 232-1. SGW 232-1 may communicate with UPF/PGW 222 either via a private network connection or via data network 240. Similarly, at UE location 406, may communicate with BS 234-2, which continues to communicate using SGW 232-1.

At UE location 407, the UE has resumed communicating with compound cellular network 210. Since the UE has resumed communicating with compound cellular network 210, the anchor point is no longer locked. At UE location 407, the UE is communicating with BS 214-1. For BS 214-1, UPF 212-2 is used as the anchor point, either because UPF 212-2 is assigned to BS 214-1 or UPF 212-2 results in one or more beneficial characteristics, such as relatively low latency compared to other UPFs. As the UE moves throughout compound cellular network 210, the UPF used as the anchor point can continue to change. If the UE moves onto cellular network 230, the anchor point may again be locked to a PGW of compound cellular network 210, which may be the same PGW previously used or a different PGW.

Figure 5:
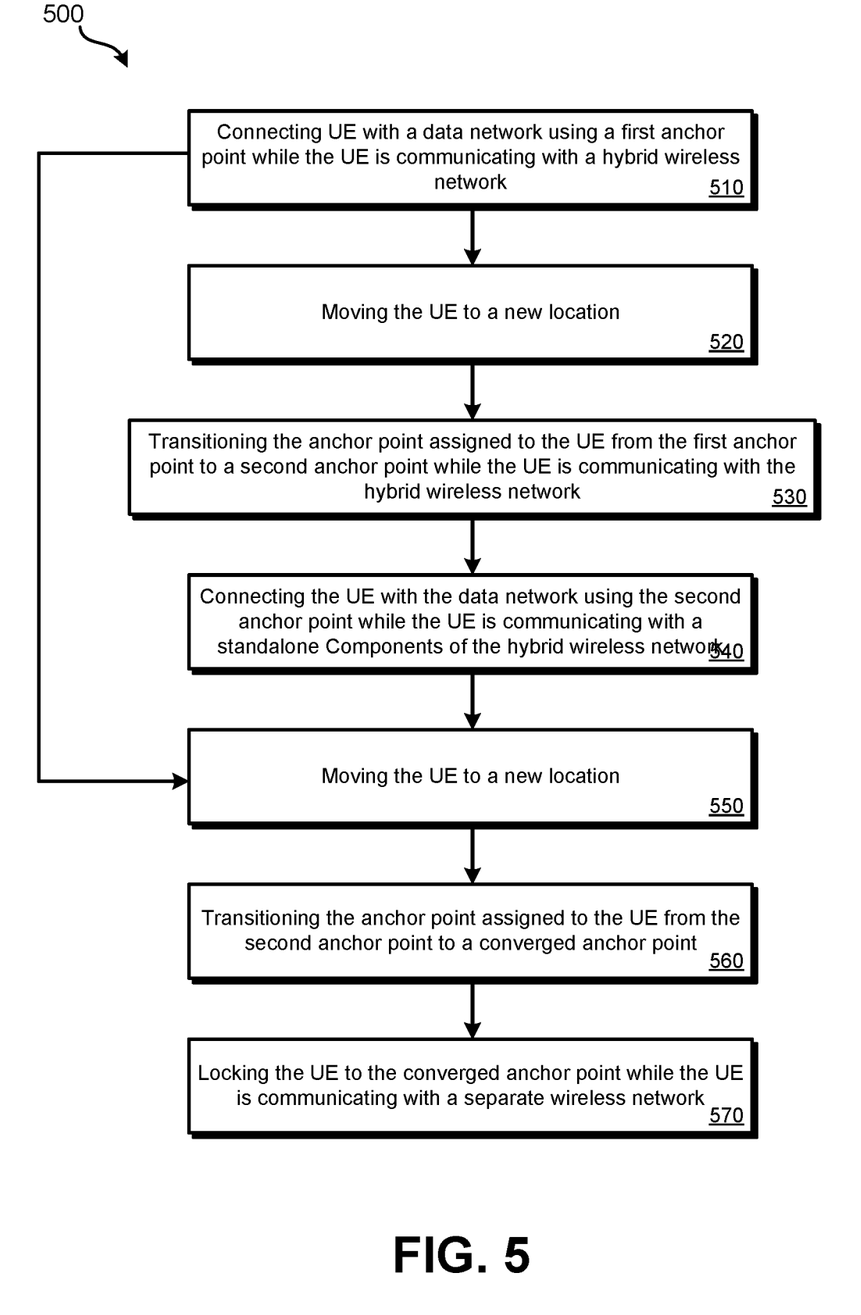
FIG. 5 illustrates an embodiment of a method for managing anchor point movement in a compound cellular network.

Various methods may be performed using the systems detailed in relation to FIGS. 1A through 4. FIG. 5 illustrates an embodiment of a method 500 for managing anchor point movement in a compound cellular network. At block 510, a UE may be connected with a data network via a first anchor point while the UE is communicating with a compound cellular network. This first anchor point may be a UPF that is not capable of functioning as a PGW for 5G RAT or non-standalone 5G. The compound cellular network can include a standalone 5G core portion and a converged 5G/4G core portion. At block 520, the UE may move to a new location that is geographically covered by the compound cellular network. In other embodiments, method 500 may proceed directly to block 550. At block 530, the anchor point assigned to the UE may be transitioned from the first anchor point to a second anchor point. This second anchor point may also be a UPF that is not capable of functioning as a PGW for 5G RAT or non-standalone 5G. Since the UE is connected with the compound cellular network, assuming the compound cellular network is set to a mode that permits it (e.g., SSC3), the anchor point can be changed, such as to allow for more efficient (e.g., lower latency, higher bandwidth) communication between the UE and the data network. At block 540, the UE may be connected with the data network using the second anchor point while the UE is communicating with the compound cellular network.

At block 550, the UE may move to another new physical location. At the new location, the UE may roam on a different cellular network, which can be operated by a different network provider. This other cellular network may be 4G LTE, non-standalone 5G (in both embodiments, 4G EPC is used for the network's core), or some other cellular network standard. At block 560, the compound cellular network may transition the UE's anchor point from the second anchor point to a converged anchor point that can function as a PGW. At block 570, the PGW may be locked as the anchor point for the UE while the UE is roaming on the different cellular network that uses 4G or non-standalone 5G. Regardless of where the UE roams on this other cellular network, the PGW of block 560 will remain the anchor point between a data network and the UE.

Once the UE returns to its home network, the anchor point is no longer locked and the anchor point can be moved among UPFs and converged UPF/PGWs of the compound cellular network. If the UE again roams onto a 4G LTE network or non-standalone 5G network, a converged UPF/PGW is again used as a fixed anchor point for the remainder of the time that the UE is roaming on the 4G or non-standalone 5G cellular network.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system, comprising:
   a first network portion of a first cellular network comprising a plurality of anchor points, wherein:
   each anchor point of the plurality of anchor points serves as a gateway for user equipment (UE) to communicate with a data network; and
   which anchor point of the plurality of anchor points serves as the gateway for a UE is adjusted while the UE is connected with the first network portion; and
   a second network portion of the first cellular network, comprising a converged anchor point, wherein:
   while the UE is connected with a second cellular network, the UE is locked to using the converged anchor point to communicate with the data network; and
   the second network portion is configured such that after the UE is locked to using the converged anchor point, the UE is later released from the converged anchor point and transitions to using an anchor point of the plurality of anchor points to communicate with the data network while the UE is in wireless communication with the first network portion.

2. The system of claim 1, wherein:
   the first network portion operates based on a first cellular communication protocol; and
   the second network portion operates according to a second cellular communication protocol.

3. The system of claim 1, wherein the data network comprises the Internet.

4. The system of claim 2, wherein the first cellular communication protocol is 5G New Radio (NR).

5. The system of claim 4, wherein the second cellular communication protocol is 4G Long Term Evolution (LTE).

6. The system of claim 4, wherein the second cellular network is a 5G cellular network that comprises 4G evolved packet core (EPC) components.

7. The system of claim 1, wherein the second network portion is located near a geographical edge of the first cellular network such that beyond the geographical edge, the UE connects with the second cellular network.

8. The system of claim 1, wherein the second network portion is physically located such that a coverage area of base stations of the second network portion overlaps a coverage area of the second cellular network.

9. The system of claim 1, wherein the second network portion remains used to communicate with the data network for the UE regardless of where the UE moves while remaining connected with the second cellular network.

10. A method comprising:
    connecting, by a first cellular network, a particular user equipment (UE) with a data network using a first anchor point of a plurality of anchor points while the particular UE is using a first network portion of the first cellular network, wherein:
    the plurality of anchor points serves as communication gateways between the data network and the particular UE; and
    transitioning, by the first cellular network, the particular UE from using the first anchor point to using a second anchor point of the plurality of anchor points to communicate with the data network while the particular UE is connected with the first cellular network;
    transitioning, by the first cellular network, the particular UE from the second anchor point to a converged anchor point of the first cellular network, wherein:
    the converged anchor point is part of a second network portion of the first cellular network; and the converged anchor point is distinct from the plurality of anchor points;

following transitioning the particular UE from the second anchor point to the converged anchor point, locking the particular UE to the converged anchor point while the particular UE is communicating with a second cellular network; and after the particular UE is locked to using the converged anchor point, releasing the particular UE from the converged anchor point such that it transitions among using anchor points of the plurality of anchor points to communicate with the data network while the UE is in wireless communication with the first network portion.

11. The method of claim 10, wherein:

the first network portion operates according to a first cellular communication protocol; and the second cellular network communicates using a second cellular communication protocol.

12. The method of claim 11, further comprising:

while connected with the first network portion of the first cellular network, communicating, by the particular UE, with the first cellular network using the first cellular communication protocol; and accessing, by the particular UE, the data network via the converged anchor point while the particular UE is connected with the second cellular network.

13. The method of claim 10, wherein the particular UE uses the converged anchor point to access to the data network regardless of where the particular UE is located while connected with the second cellular network.

14. The method of claim 11, wherein the first cellular communication protocol is 5G New Radio (NR) and the second cellular communication protocol is 4G Long Term Evolution (LTE).

15. The method of claim 10, wherein the second cellular network is a 5G network that comprises 4G evolved packet core (EPC) components.

16. The method of claim 10, wherein the data network comprises the Internet.

17. The method of claim 10, wherein the second network portion is located near a physical edge of the first cellular network such that beyond the physical edge of the first cellular network, the particular UE communicates with the second cellular network.

* * * * *